United States Patent [19]
Church et al.

[11] Patent Number: 6,058,370
[45] Date of Patent: May 2, 2000

[54] METHOD OF FORECASTING AMBULANCE SERVICE DEMAND

[76] Inventors: Richard L. Church; Paul A. Sorensen, 5370 Hollister Ave., #5, both of Santa Barbara, Calif. 93111

[21] Appl. No.: 09/144,738

[22] Filed: Sep. 1, 1998

[51] Int. Cl.[7] .................................................... G06F 17/60
[52] U.S. Cl. .............................. 705/10; 705/705; 705/5; 705/7; 705/8; 705/9; 705/10; 701/1
[58] Field of Search .................................. 705/1, 5, 6, 7, 705/8, 9, 10, 13; 701/1; 706/905

[56] References Cited

U.S. PATENT DOCUMENTS

| | | | |
|---|---|---|---|
| 5,289,368 | 2/1994 | Jordan et al. | 705/8 |
| 5,459,656 | 10/1995 | Fields et al. | 705/7 |
| 5,541,835 | 7/1996 | Dextraze et al. | 705/10 |

OTHER PUBLICATIONS

Singh, V.K., et al., "Operation Research for Estimation of an Ambulance Requirement in a Hospital," Computer Methods and Programs in Biomedicine, vol. 33, 1990, pp. 59–63.

Larson, Richard C., "Ambulamce Deployment With the Hypercube Queuing Model," Medical Instrumentation, vol. 16, No. 4, Jul.–Aug. 1982.

Baker, J.R., et al., "Determination of an Optimal Forecast Model for Ambulance Demand Using Goa; Programming," Journal of the Operational Research Society, vol. 37, No. 11, 1986, pp. 1047–1059.

Kvalseth, Tarold O., et al., "A Demand Model for Emergency Ambulance Service in an Urban Area," Int Conf on Cybern and Soc, Nov. 5–7, 1973, pp. 176–177. Available from IEEE (73 CHO 799–7 SMC).

Tandberg, Dan, et al., "Time Series Forecasts of Ambulance Run Volume," The American Journal of Emergency Medicine, May 1998, pp. 232–237.

Primary Examiner—James P. Trammell
Assistant Examiner—George D. Morgan
Attorney, Agent, or Firm—Gene W. Arant; Larry D. Baker

[57] ABSTRACT

A method of forecasting the demand for ambulance services based upon a determination from the historical record of the number of currently active calls at the time each new call is received. The method may utilize records of specific calls history including the time each call was received and the time each call was completed, or it may use information on the number of calls received each hour to simulate specific calls history. The method may be extended to a "third dimension" to better account for the effect of service demands and staffing levels in preceding hours. The method has application to other services having the characteristics of limited available service resources, randomly occurring service requests but historically-repeating levels of demand, and relatively long service times.

5 Claims, 7 Drawing Sheets

FIG. 5

| UNITS BUSY | WEEK 1 | 2 | 3 | 4 | 5 | 6 | 7 | 8 | 9 | 10 | 11 | 12 | 13 | 14 | 15 | 16 | 17 | 18 | 19 | 20 | Σ | [A] | [B] |
|---|---|---|---|---|---|---|---|---|---|---|---|---|---|---|---|---|---|---|---|---|---|---|---|
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 100.0 |
| 10 | 0 | 0 | 0 | 0 | 0 | 0 | 0 | 0 | 0 | 0 | 0 | 0 | 0 | 0 | 0 | 0 | 0 | 1 | 0 | 2 | 3 | 1.8 | 100.0 |
| 9  | 2 | 0 | 3 | 1 | 1 | 2 | 3 | 1 | 3 | 2 | 2 | 2 | 1 | 2 | 3 | 3 | 3 | 3 | 2 | 2 | 40 | 23.8 | 98.2 |
| 8  | 3 | 5 | 4 | 5 | 6 | 3 | 2 | 2 | 4 | 3 | 3 | 2 | 3 | 4 | 4 | 4 | 5 | 3 | 4 | 4 | 73 | 43.4 | 74.4 |
| 7  | 3 | 4 | 2 | 2 | 2 | 4 | 3 | 1 | 1 | 5 | 2 | 4 | 4 | 2 | 2 | 3 | 4 | 2 | 3 | 3 | 48 | 28.6 | 31.0 |
| 6  | 0 | 0 | 1 | 0 | 0 | 0 | 0 | 0 | 2 | 0 | 0 | 0 | 0 | 0 | 0 | 0 | 0 | 1 | 0 | 0 | 4 | 2.4 | 2.4 |
| 5  | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 0.00 |
| 4  | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 0.0 |
| 3  | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 0.0 |
| 2  | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 0.0 |
| 1  | 0 | 0 | 0 | 0 | 0 | 0 | 0 | 0 | 0 | 0 | 0 | 0 | 0 | 0 | 0 | 0 | 0 | 0 | 0 | 0 | 0 | 0.0 | 0.0 |
|    | 8 | 9 | 7 | 9 | 9 | 9 | 8 | 7 | 10 | 10 | 8 | 8 | 8 | 8 | 9 | 10 | 8 | 8 | 8 | 8 | 165 | | |

[A] $\%_{iP} = \dfrac{N_{iK}}{N_{iT}} \times 100$

[B] $\text{CUM}\%_{iP} = \dfrac{\sum_{K=1}^{P} N_{iK}}{N_{iT}} \times 100$

FIG. 6

| Units | 12 to 1 am | 1 to 2 am | 2 to 3 am | 3 to 4 am | 4 to 5 am | 5 to 6 am | 6 to 7 am | 7 to 8 am | 8 to 9 am | 9 to 10 am | 10 to 11 am | 11 am to 12 pm | 12 to 1 pm | 1 to 2 pm | 2 to 3 pm | 3 to 4 pm | 4 to 5 pm | 5 to 6 pm | 6 to 7 pm | 7 to 8 pm | 8 to 9 pm | 9 to 10 pm | 10 to 11 pm | 11 pm to 12 am |
|---|---|---|---|---|---|---|---|---|---|---|---|---|---|---|---|---|---|---|---|---|---|---|---|---|
| 11 | 100.0 | 100.0 | 100.0 | 100.0 | 100.0 | 100.0 | 100.0 | 99.3 | 99.4 | 100.0 | 100.0 | 100.0 | 100.0 | 100.0 | 100.0 | 100.0 | 100.0 | 100.0 | 98.8 | 100.0 | 98.2 | 100.0 | 100.0 | 100.0 |
| 10 | 100.0 | 100.0 | 100.0 | 100.0 | 100.0 | 100.0 | 96.0 | 90.6 | 95.8 | 99.4 | 100.0 | 100.0 | 100.0 | 100.0 | 100.0 | 100.0 | 96.5 | 97.0 | 86.2 | 92.5 | 88.8 | 100.0 | 100.0 | 100.0 |
| 9 | 100.0 | 100.0 | 100.0 | 100.0 | 100.0 | 96.9 | 69.3 | 59.0 | 68.0 | 83.5 | 94.0 | 100.0 | 98.8 | 96.0 | 98.2 | 100.0 | 75.4 | 75.7 | 49.1 | 70.1 | 51.1 | 100.0 | 100.0 | 100.0 |
| 8 | 100.0 | 100.0 | 100.0 | 100.0 | 96.6 | 76.5 | 26.7 | 12.4 | 28.4 | 47.6 | 73.3 | 90.9 | 88.1 | 77.2 | 74.4 | 99.4 | 30.8 | 34.9 | 13.1 | 28.1 | 12.3 | 94.9 | 100.0 | 100.0 |
| 7 | 100.0 | 99.4 | 100.0 | 94.1 | 72.7 | 30.8 | 1.1 | 1.2 | 4.5 | 12.3 | 31.7 | 45.7 | 50.9 | 28.9 | 31.0 | 98.2 | 3.4 | 4.7 | 0.5 | 3.4 | 0.0 | 73.4 | 99.4 | 100.0 |
| 6 | 99.4 | 95.8 | 98.8 | 70.6 | 32.4 | 3.7 | 0.0 | 0.6 | 0.0 | 0.0 | 4.1 | 12.6 | 11.2 | 3.9 | 2.4 | 85.0 | 0.6 | 1.2 | 0.0 | 0.0 | 0.0 | 26.5 | 94.1 | 100.0 |
| 5 | 89.8 | 71.6 | 85.0 | 35.3 | 6.2 | 0.0 | 0.0 | 0.6 | 0.0 | 0.0 | 0.0 | 0.6 | 1.2 | 0.0 | 0.0 | 48.5 | 0.0 | 0.0 | 0.0 | 0.0 | 0.0 | 1.1 | 75.9 | 93.8 |
| 4 | 51.2 | 27.2 | 49.7 | 5.9 | 0.0 | 0.0 | 0.0 | 0.0 | 0.0 | 0.0 | 0.0 | 0.0 | 0.0 | 0.0 | 0.0 | 11.4 | 0.0 | 0.0 | 0.0 | 0.0 | 0.0 | 0.0 | 27.6 | 68.7 |
| 3 | 11.3 | 4.1 | 13.2 | 0.6 | 0.0 | 0.0 | 0.0 | 0.0 | 0.0 | 0.0 | 0.0 | 0.0 | 0.0 | 0.0 | 0.0 | 0.6 | 0.0 | 0.0 | 0.0 | 0.0 | 0.0 | 0.0 | 4.1 | 28.3 |
| 2 | 0.0 | 0.0 | 0.6 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 4.2 |
| 1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

UNITS AVAILABLE

METHOD OF FORECASTING AMBULANCE SERVICE DEMAND

BACKGROUND OF THE INVENTION

1. Field of the Invention

The present invention relates to methods of gathering and analyzing emergency service data for the purposes of forecasting future emergency medical service requirements, allocating resources, and generating work schedules.

2. Description of the Prior Art

The logistics of managing emergency medical services presents a challenging set of problems. Schedulers are faced with the task of providing sufficient resources to meet randomly-occurring requests for service, where delays in response are unacceptable, yet must increasingly be concerned with the overall cost of such services. Emergency medical services are labor intensive, with typically 80% or more of the operating costs being manpower. Since service performance levels are often mandated by law, with requirements that a certain percentage of calls be handled within a given response time, schedulers must also find ways to anticipate the effects of their resource allocation and scheduling decisions on actual performance levels in the field. The past 25 years have seen the increased application of Operations Research and Management Science to these public safety and emergency medical services problems (Kolesar, P., & Swersey, A. J. [1986] "The deployment of urban emergency units: a survey," TIMS Studies in the Management Studies 22, pp. 87–119).

The demand for emergency medical services has the characteristics of the essentially random occurrence of individual calls, but with demand levels which recur in historically discernible patterns. The time required to service each call is long with respect to the scheduling increment of crew shifts, typically ranging from 15 minutes for a call not requiring transport to well over an hour (prior art scheduling methods often assume each call lasts one hour). Emergency medical services providers have generally divided the week into 168 one hour increments, and tracked incoming calls on that basis. There can be significant changes in the historical level of demand from one hour to the next, such as a peak in demand in the hour after bars close, followed by a rapid decline. Since calls represent essentially random events, data on the level of demand must be collected over a period of weeks or months to accurately quantify the level of demand.

In recent years many local governments have contracted out all or part of their emergency medical services to private providers. The private providers are required to meet specific standards with respect to call response times, typically expressed as a percentage of calls in which a unit must arrive "on scene" within a specified response time (e.g., 95% of calls responded to within 10 minutes). To be competitive in the marketplace, both for the purposes of competitive bidding on future contracts and for maintaining profitability of existing contracts, providers must have information on historical levels of demand that allow them to accurately forecast future demand and provide adequate levels of staffing, without incurring unnecessary costs. A more accurate method of measuring demand, together with more sophisticated scheduling methods, can be a major marketplace advantage.

Two constraints on the gathering of utilization data have in the past been the level of expertise of the personnel involved in the dispatch operation and the limitations of past Computer Aided Dispatch ("CAD") systems. In smaller service areas, the dispatcher may be a driver or Emergency Medical Technician (EMT) who serves part time as dispatcher; in larger service areas, full time dispatchers may be employed. The dispatchers will generally be trained as an EMT, but are unlikely to have an understanding of statistics or higher mathematics. Making a record of the number of calls received per hour is a task which is easily understood and which can be performed by personnel of any experience level, without the need for advanced training; hence the EMS industry's adoption of calls received as the basis for generating usage, allocation and scheduling reports. Computer Aided Dispatch (CAD) systems have the capability to collect and store much more detailed information on each call received, however, this information has generally not been well-utilized by the industry.

Prior Art Methods of Estimating Service Demand

There are several different approaches that have been suggested for determining how many ambulances or pieces of emergency equipment need to be deployed in a given time period. Several of these approaches present an integrated model for identifying the number of units needed and their locations. There are also numerous papers that have been written on estimating demand and scheduling crews. Four basic approaches have been used or proposed:

1) Estimates based upon the number of calls for service received per time period;
   a) Estimates based upon an analysis of empirical data;
   b) Estimates based upon a theoretical distribution;
2) Estimates based upon the use of some form of queuing theory;
3) Estimates based upon simulation models; and
4) Estimates based upon workload criteria and average call rates and service times.

In the United States, the majority of emergency medical service providers utilize some form of the first approach. This is due to two major factors: (1) data on ambulance service has historically been collected in terms of the number of calls received in a given hour, and (2) the influence of Dr. Jack Stout. Prior to the widespread adoption of computer-aided dispatch ("CAD") systems, records of the number of calls received in a given hour were generally the most reliable and complete indication of service demand. Call data is still usually distilled down for the purposes of planning to the number of calls received in a given hour, despite the availability from CAD systems of much more complete information about the calls. This fact alone has focused the development of demand estimation techniques to be based principally upon such a number.

Further adding to the use of this technique is the industry leadership of Dr. Jack Stout. Dr. Stout exerts a large influence on the EMS industry since he helped define planning techniques and popularize methodologies for EMS planning and operation. Dr. Stout is credited with the development of the System Status Management approach to EMS operation (Stout, J. L. [1983] "System Status Management: The strategy of ambulance placement," *Journal of Emergency Medical Services*, May, pp. 22–32). Such an approach includes a straightforward method to estimating the number of units needed in a given hour.

FIG. 1 illustrates common prior art methods of estimating demand based on the number of calls received per time period. These methods rely on an historical database 110 consisting of a record of the number of calls received per time period 112. A number of different techniques (122, 124, 126) are used to generate a table of unit demand per time period 132. This unit demand per time period table is then used as an input for resource allocation and scheduling 140, which may consist simply of manually fitting a schedule to the unit demand table profile, but may include more sophisticated computerized techniques, taking into account the types of work shifts available (e.g., full time, part time , etc.). Since emergency medical services are now often contracted out by local governments to commercial providers and are the subject of competitive bidding, the "recipes" used for resource allocation and scheduling are often trade secrets, representing a potential competitive edge over competing other service providers.

Table 1 is an example of the "classic" Stout 122 approach. Calls per time period data

TABLE 1

| Calls received -- Monday, 2–3 p.m. | | | |
|---|---|---|---|
| Week 1: | 8 | Week 11: | 11 |
| Week 2: | 9 | Week 12: | 10 |
| Week 3: | 9 | Week 13: | 7 |
| Week 4: | 11 | Week 14: | 8 |
| Week 5: | 11 | Week 15: | 10 |
| Week 6: | 8 | Week 16: | 7 |
| Week 7: | 13 | Week 17: | 7 |
| Week 8: | 8 | Week 18: | 8 |
| Week 9: | 8 | Week 19: | 7 |
| Week 10: | 8 | Week 20: | 10 | is collected for a statistically significant historical period, such as 20 to 28 weeks. The basic premise is that the number of units needed in a given hour can be estimated as the number of calls that is equaled or exceeded only a small percentage of the time. This is estimated as one of highest call volumes received in a given hour during some period of time. For example, based on twenty weeks of calls-received one might estimate that the needed number of equipment to be operating in a given hour (e.g. 2–3 p.m. on Mondays) is the second highest call volume received in that hour during a given time period (e.g. 20 weeks). In the example of Table 1, the highest value of 13 calls in week 7 would be discarded and the 2–3 p.m. Monday entry in the unit demand table would be set to the second highest value, 11. Different criteria could also be used, such as selecting the highest value, or an average of values over the study period (e.g. 20 weeks).

Variations of this basic technique, or "modified" Stout 124, estimate the needed vehicles based upon the call volume of a given hour as well as that of the preceding hour (and sometimes the subsequent hour). Since the original Stout approach does not take into consideration how many units might already be busy during the early portion of that hour based upon calls that came in the previous hour, it may under-estimate or over-estimate true demand for that hour (e.g., if the "11" of the example is followed in the next hour by a "9", the first part of the "9" hour could potentially be understaffed due to the many units still out on calls). This effect of the previous hour's demand on the current hour is important and has generally been observed by planners. To compensate for such an effect, planners have averaged call rates in hours, added portions of previous call volumes to the current hour, etc. The idea is to compensate for the effect by adding in some of the demand from the previous hour, and subtracting some of the current demand, which affects the subsequent hour. Much of this is done based upon ad hoc rules, which appear to help improve the demand estimate.

Numerous other refinements to the "classic" EMS allocation approach have been proposed; these can generally be characterized as other "spreadsheet" methods 126. In addition to utilizing empirical data directly in making such estimates, some have attempted to fit a regression model to the data and then use the model to make estimates. Trudeau, et al, give a good example of such an approach for the City of Montreal (Trudeau, P, Rosseau, J-M., Ferland, J. A., Choquette, J. [1988] "An operations research approach for the planning and operation of an ambulance service," *INFOR*, Vol.27(1), pp. 95–113). In that work, daily demand is estimated and then a model is used to estimate how the demand is distributed by each hour of the day. Their final estimate in terms of what is needed is still based, however, on the number of calls received per time period.

The unit demand table that results from these methods consists of a single entry for each hour period, representing the number of units anticipated to be needed in that hour. A limitation of all methods which schedule resources on the basis of a unit demand table is that they provide little insight as to where additional resources should be placed for maximum benefit, or, conversely, if resources are limited, where cuts can be made with the least impact on the overall level of service. Such decisions are typically left to the "instincts" of the scheduler, which might be quite good, but which are likely to be overtaxed by larger EMS systems.

The second major approach that has been used to estimate ambulance demand is the use of some form of queuing theory. Queuing theory deals with estimating the probabilities that waiting lines of specific lengths will happen, given assumptions about the distribution of calls for service and the distribution of service times. The earliest work that uses queuing theory applied to ambulance analysis is Bell and Allen (Bell, C. E., & Allen, D. [1969] "Optimal planning of an emergency ambulance service," *Socio. -Econ. Plan. Sci*, Vol. 3, pp. 95–101).

Queuing theory has been a popular technique among academic researchers as the theory is associated with estimating precisely what planners need. The number of calls in a time period tends to follow a Poisson process with exponential inter-arrival times of calls. Also, it can be assumed that service times are either constant or exponentially distributed as well. Much of queuing theory is based upon such assumptions. Queuing theory can be used to help estimate average waiting time for service and the probability of various states occurring, i.e. the number of busy vehicles. The steady-state probability of n-users requiring service in a queuing system represents the probability of having exactly n users in the system at a given time. Thus, knowing the steady-state probabilities of a system, one will know exactly how many ambulances will be busy a certain percentage of the time. Given such steady-state probabilities, one can then estimate the needed number of servers to keep the probability of 1 or more waiting in a queue to be less than some acceptable level, alpha, where alpha is generally 5% or less. Such an estimate holds when a system is at steady-state.

Unfortunately, an EMS system is not always at a steady state. The problem is further complicated by the fact that the service is delivered to users instead of the users coming to where the service is provided. To extend queuing theory to a spatial/geographical application in which servers travel to provide the service, Larson developed the hypercube queuing model (Larson, R. C. [1974] "A hypercube queuing model for facility location and redistricting in urban emergency services," *Computers and Operations Research*, Vol. 1(1), pp.-67–95). The hypercube queuing model attempts to analyze geographically distributed emergency servers and estimate the states of the system based upon various servers being busy.

The hypercube model suffers from four principal problems. The first is that such estimates are still steady state probabilities, and the system may not be at steady state. The second is that the model grows in complexity as the number of servers increases, and as a result it is only possible to generate approximate solutions for realistically sized applications. The third problem is that the hypercube queuing model handles only one type of call and in practice there can be several call types. The last problem involves the assumption that vehicles always return to the same base, and this is often not the case.

Simulation models, the third basic prior art approach, have also been used to estimate how many units are required to provide adequate service (Ignall, E. J., Kolesar, P., & Walker, W. E. [1978] "Using simulation to develop and validate analytic models: some case studies," Vol. 26(2), pp. 237–253). The fact remains that simulation models represent the best approach to capture many of the complexities of an EMS system in making an estimate of exactly what type of performance can be achieved for a given number of provided units. The idea is that all of the major components of the system response can be estimated and simulated so that the simulation model can produce a real estimate of exactly what would happen. The concept is to simulate a system operation by simulating calls and service. After simulating a sufficiently long period of time, then it is possible to estimate the levels of service provided. To do this in a manner which yields results which are useful to planners requires good data on practically every aspect of the system for a given application, including travel times between given points on the street network.

Although such estimates are not impossible to make, much of the industry has not been in support of simulation because of three factors: (1) the costs to develop and validate a simulation model can be large, (2) the shortage of good data on specific aspects of the service process, and (3) the lack of a good travel time estimation model. A secondary problem is that simulation is a process which can only estimate the performance of a given crew allocation. To determine the best crew allocation may require many runs in order to single out the solution which provides the best balance between cost and service level. Unfortunately, simulation systems are not universally available for EMS planning. Further, significant data needs to be collected and prepared to perform a simulation analysis. Finally, simulation requires a sizable amount of computer time for running a reasonable set of allocation scenarios.

The fourth basic prior art approach involves utilizing workload estimates. Such efforts are reflected in the work of ReVelle and Hogan (ReVelle, C. S., & Hogan, K. [1989] "The maximum availability location model," *Transportation Science*, Vol. 23(3), pp. 192); Baker et al (Baker, J. R., Clayton, E. R., Moore, L .J. [1989] "Redesign of primary response areas for county ambulance services," *European Journal of Operations Research*, Vol. 41, pp. 23–32; and Baker, J. R., Clayton, E. R., & Taylor, B. W. 111(1989) "A non-linear multi-criteria programming approach for determining county emergency medical service ambulance allocations," *Journal of Operational Research Society*, Vol. 40(5), pp. 423–432). The basic concept is that if service times take an average of y time, the number of calls expected equals c, and each unit is available to serve hours, then the number of units, x, needed to provide service can be calculated through the formula:

$$\frac{cy}{ax} \le b \tag{1}$$

Where b is an upper limit on workload (e.g. 0.4) and x is the smallest value such that the expression is true. The idea is that workload of any given unit should not exceed a specified value. In the EMS industry an accepted workload value is 0.4, meaning that a typical unit will actively servicing a call 40% of the time. The needed number of units can be estimated on a global basis or sector by sector as well. Hogan and ReVelle devised a concept of busyness around a given demand area in the same fashion. The idea is that if the average workload of the units that can respond to a given demand is at a specific level b, then the number of needed units, x, can be calculated using the following formula:

$$(1-b)^x \le \alpha \tag{2}$$

Or $$\left(1 - \frac{cy}{ax}\right)^x \le \alpha \tag{3}$$

where alpha is the performance level of the system and x is again the smallest integer number such that the expression is true. For this case c is the measure of demand of the surrounding area. While such estimates are easy to calculate, they are not necessarily accurate. Also such techniques are based upon a uniform distribution of calls and represents busyness for one time period alone. The effects of busyness in the previous time period on a subsequent time period are ignored.

In view of the limitations of current methods of collecting and analyzing historical data for the purpose of predicting future demand for Emergency Medical Services, there is a need for methods which more accurately determine the level of demand for a given hour of the week, and which provide additional information allowing consideration of tradeoffs that may be made in the scheduling of resources.

SUMMARY OF THE INVENTION

In view of the shortcomings of current resource allocation and scheduling methods, the present invention is directed to methods of allocating and scheduling resources having the characteristics of limited available service resources, randomly occurring service requests but historically-repeating levels of demand, and relatively long service times, such as emergency medical service (EMS), with improved accuracy and improved ability to assess tradeoffs in scheduling decisions.

The present invention provides an improved representation of true historical workloads through the use of an active calls table, based on a determination of the number of calls being serviced when a new request for service is received;

The present invention, by utilizing information on active calls, more accurately reflects the effects of non-steady state demand than do methods based on calls received data;

The present invention provides additional information for use is assessing resource allocation and scheduling tradeoffs, allowing for more informed decisions to be made, through the use of matrices reflecting percentages of resource availability and response at given demand levels, rather than the unit demand tables common in the prior art;

The present invention further allows for the generation of an active calls table from data comprising records of calls per time period, allowing use of the method in situations where detailed specific calls history is not available;

The present invention allows actual response time information to be incorporated into scheduling decisions through the use of augmented calls history information to generate an on-time response matrix;

The present invention provides a variety of inputs to the resource allocation and scheduling process, allowing the process to be tailored to different scheduling situations and commercial needs; and The present invention avoids the costs and logistics problems of simulating emergency medical services systems by utilizing actual historical data about past calls.

BRIEF DESCRIPTION OF THE DRAWINGS

The invention is further described in connection with the accompanying drawings, in which:

FIG. 5 is an example active calls table, illustrating how active calls information from an historical period is combined to give a cumulative total of active calls and active calls percentages and cumulative percentages;

FIG. 6 is a sample response availability profile; and

DESCRIPTION OF THE PREFERRED EMBODIMENT

As discussed above, the most common prior art emergency medical services resource allocation and scheduling methods utilize data accumulated over a statistically significant historical period, such as 20 or more weeks, to project future demand. Prior art methods most commonly utilize only data on the number of calls for service received in each hour. The present invention also utilizes data accumulated over a statistically significant historical period, but improves on the prior art estimates of demand by utilizing the concept of "active calls."

"Active calls" represent the number of units currently servicing calls when a new call is received, if 9 units are currently busy and a new call is received, the number of active calls would become 10. The method of the present invention involves estimating demand based upon the distribution of active calls in each hour and not directly on the number of calls received. The total number of calls received represents one measure of work, but the number of actual active calls at any time tells more about the actual need for crews.

Figure 1:
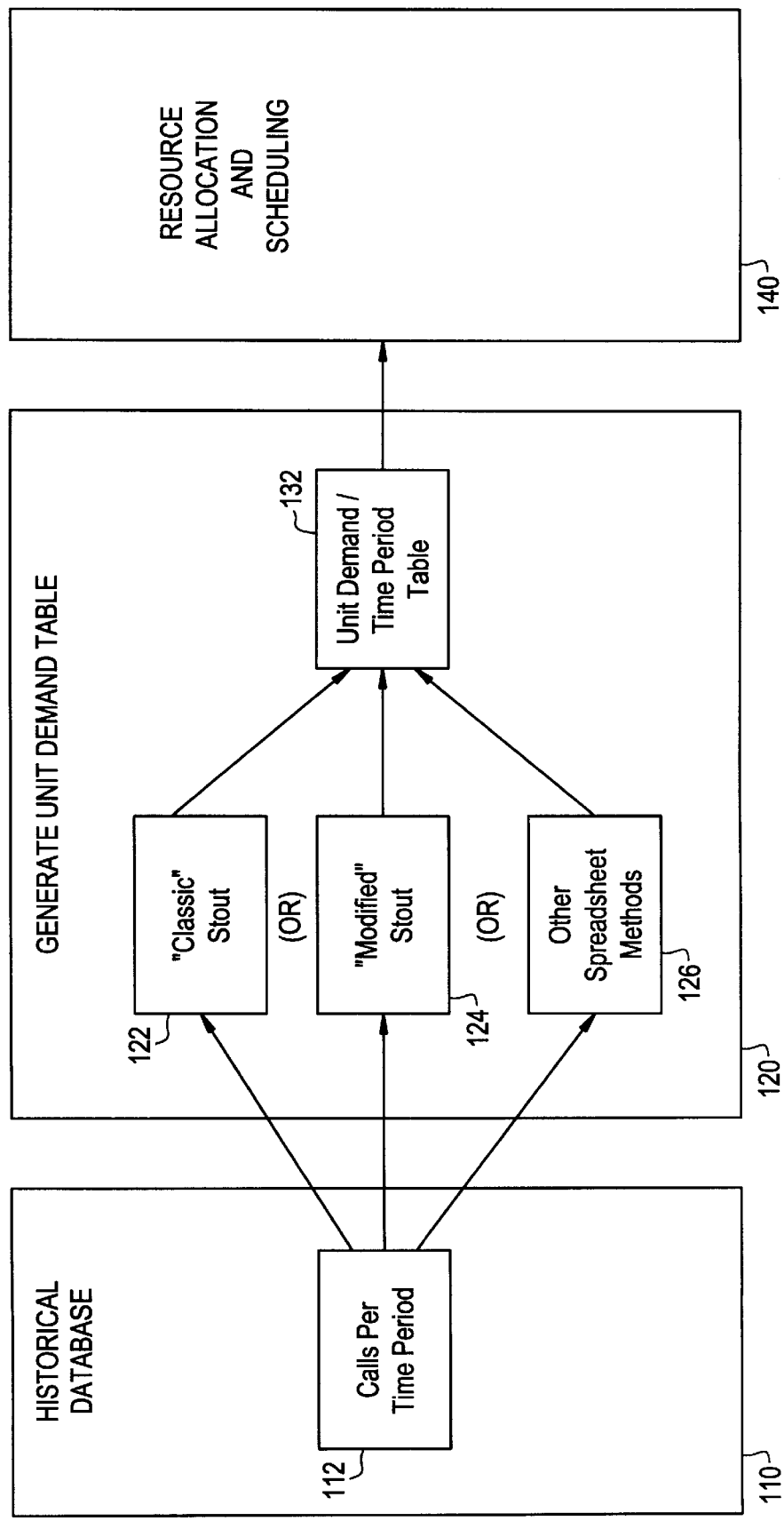
FIG. 1 is a block diagram of a common prior art method of forecasting service demand, based on the generation of a unit demand per time period table.
Figure 2:
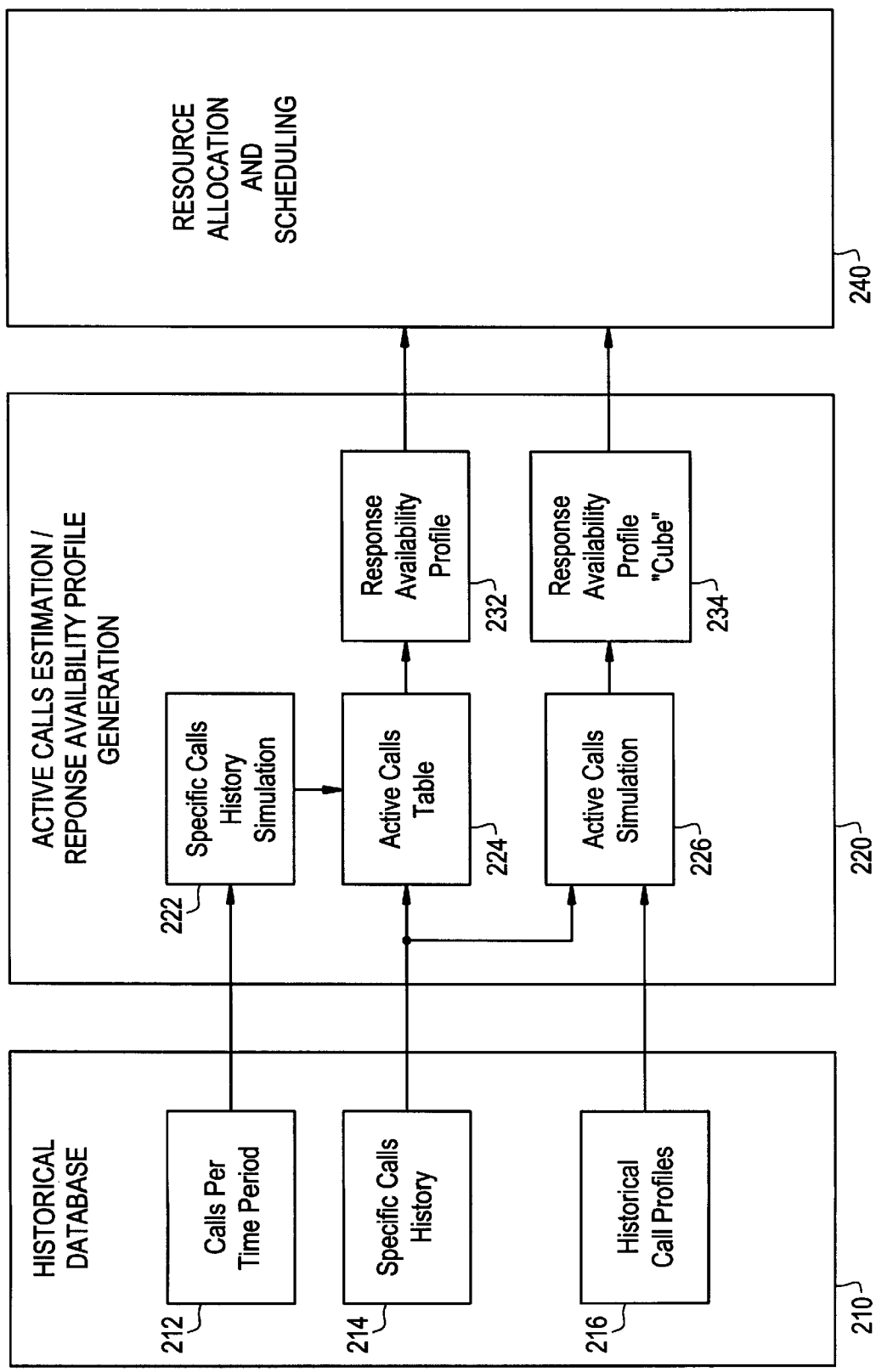
FIG. 2 is a top-level block diagram of the method of the present invention.

As shown in FIG. 2, the present invention comprises active calls estimation and response availability profile generation 220, the essential feature of which is the generation and use of an active calls table 224. The active calls table 224 is then utilized in the generation of a table representation of demand ("response availability profile" 232) which in turn can be used as an input for resource allocation and scheduling 240. The active calls table 224 may be generated from specific calls history 214 contained in an historical database 210, or, if such information not available, specific calls history may be simulated 222 from a record of calls per time period 212.

By simulating the number of calls that would have been active for different hypothetical staffing levels, based on the actual specific calls history 214 and historical profiles of response and service times 216, the method of the present invention may be extended to a "third dimension", resulting in a response availability "cube" 234 that provides greater insight into the effect of staffing levels during the preceding hours. This "cube" may also be used as an input for resource allocation and scheduling.

Resource allocation and scheduling 240 can include many common scheduling techniques, such as ad hoc rules handed dozen from schedulers as a corporate approach, and heuristic and optimization modelling; often a "recipe" of methods will have been developed by a service provider as a trade secret.

Number of Active Calls Data

Figure 3:
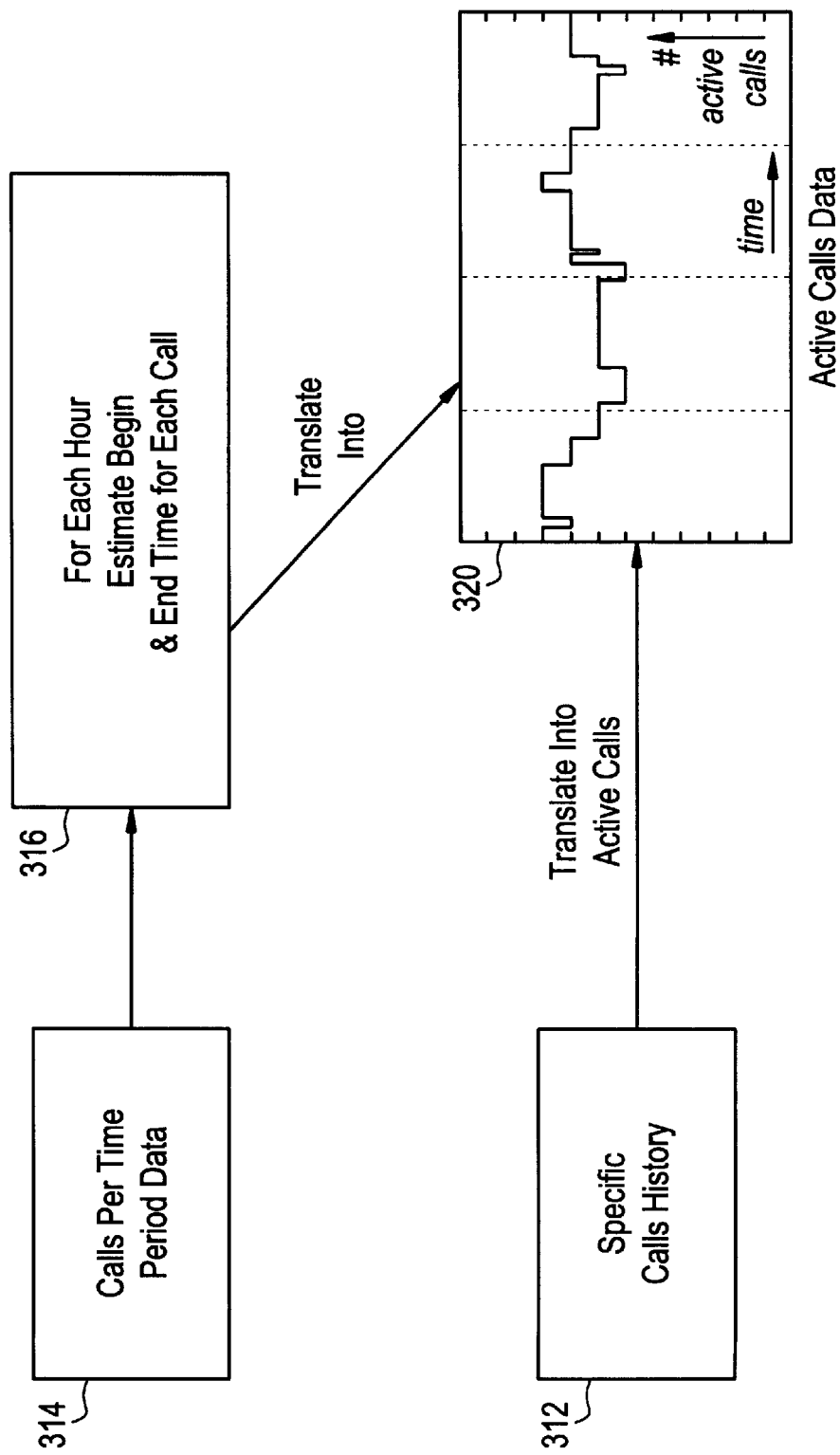
FIG. 3 is a more detailed block diagram illustrating the creation of an active calls table from either specific calls history or from calls per time period data.

FIG. 3 more graphically illustrates the generation of active calls data 320. Data from a specific calls history database 312, which includes information about the time each call was received and the time at which each call was completed, is used to determine the number of active calls at each point in time. Alternatively, if no specific calls history is available, calls per time period data 314 may be used to estimate the beginning and end time for each call 316. The number of active calls at a particular time is the number of units previously dispatched which have not completed their calls. Thus, if at the beginning of an hour 9 units are currently in the field servicing calls, the measure of active calls would be 9; if a new call were received, the number of active calls would increase to 10.

Figure 4:
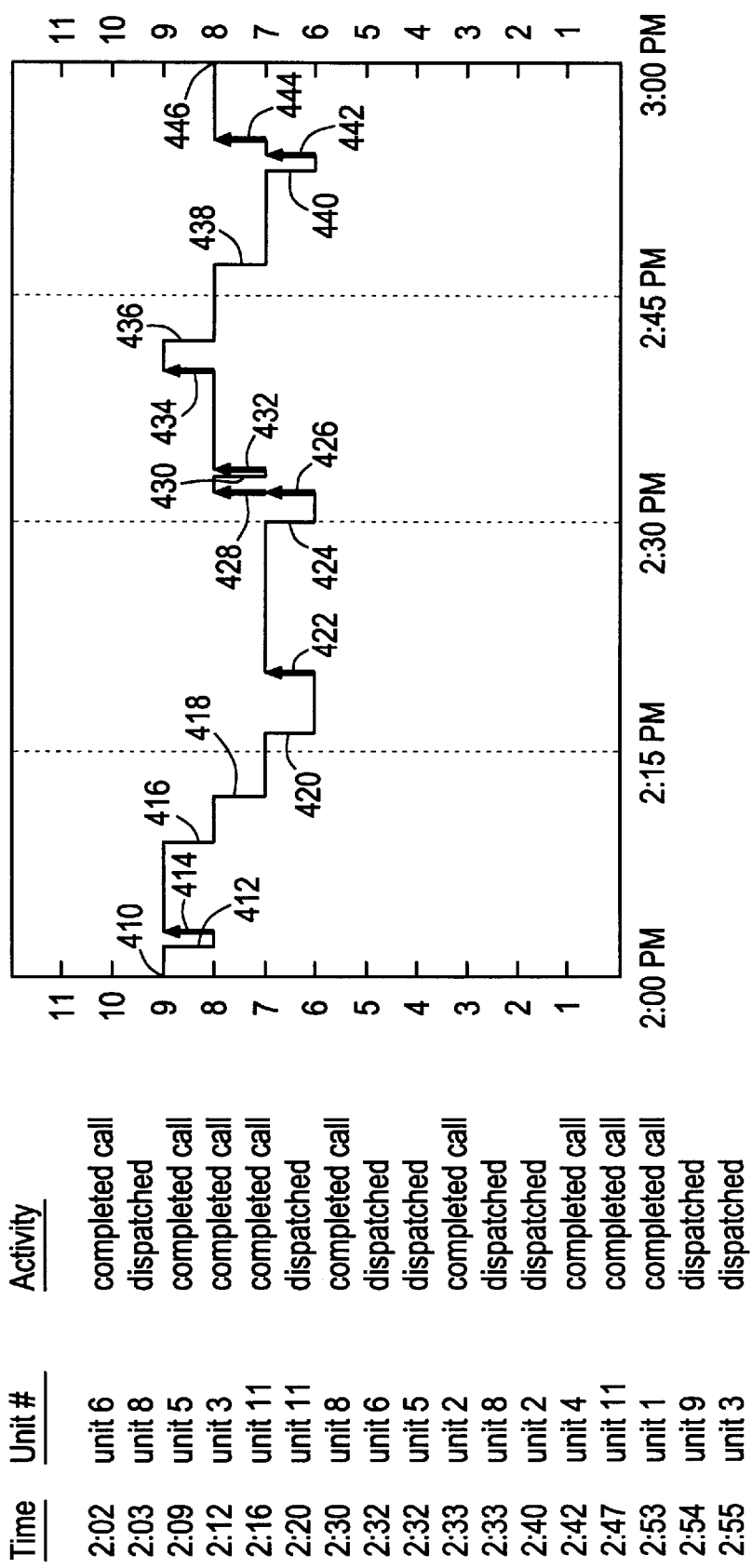
FIG. 4 is a graphical representation of the generation of an active calls table.

FIG. 4, with Table 2 below, illustrates the generation of active calls data for a sample set of data for the hour from 2 p.m. to 3 p.m. on Monday. At 2 p.m. [141] as an initial condition for the hour, previous calls history would indicate that 9 active calls were being serviced (9 units had been dispatched which have not yet completed their calls). At 2:02 p.m. [1412], unit 6 completes it's call, and the number of active calls drops to 8. At 2:03 [414] a call is received and unit 8 is dispatched, representing the 9th active call. At 2:09, 2:12, and 2:16 [416, 418, 420] units complete calls. At 2:20 [422], a call is received and unit 11 is dispatched, representing the 7th active call. At 2:30 [424] a call is completed, at 2:32, two units are dispatched [426, 428], representing the 7th and 8th active calls. At 2:33 a unit completes a call [430] and a new call is received [432], the 8th active call. at 2:40 [434] a 9th active call is dispatched, at 2:42, 2:47, and 2:53 calls are completed [436, 438, 440]. Finally, at 2:54 and 2:55 calls are dispatched [442, 444] as the 7th and 8th active calls, so that at the conclusion of the hour there are 8 units in the field on active calls [446].

TABLE 2

| Time | Activity | Unit # |
| --- | --- | --- |
| 2:02 | completed call | unit 6 |
| 2:03 | call rcv'd - unit dispatched | unit 8 |
| 2:09 | completed call | unit 5 |
| 2:12 | completed call | unit 3 |
| 2:16 | completed call | unit 11 |
| 2:20 | call rcv'd - unit dispatched | unit 11 |
| 2:30 | completed call | unit 8 |
| 2:32 | call rcv'd - unit dispatched | unit 6 |
| 2:32 | call rcv'd - unit dispatched | unit 5 |
| 2:33 | completed call | unit 2 |
| 2:33 | call rcv'd - unit dispatched | unit 8 |
| 2:40 | call rcv'd - unit dispatched | unit 2 |
| 2:42 | completed call | unit 4 |
| 2:47 | completed call | unit 11 |
| 2:53 | completed call | unit 1 |
| 2:54 | call rcv'd - unit dispatched | unit 9 |

TABLE 2-continued

| Time | Activity | Unit # |
| --- | --- | --- |
| 2:55 | call rcv'd - unit dispatched | unit 3 |

Specific Calls History Simulation

As shown in FIG. 2, if specific calls history data is unavailable or incomplete, specific calls history can be simulated 222 from calls per time period information 212, and used to generate an active calls table as described above. To simulate specific calls history, either historical information is utilized to determine the distribution of call service times or a reasonable estimate is made regarding the distribution. The calls received in a time period are assigned randomly-distributed times of arrival, and a service time is assigned to each call based on the assumed distribution of service times. The call times and service completion times are then used to generate an active calls table 224, as described above.

Active Calls Table

FIG. 5 illustrates how accumulated active calls data is used to compute cumulative active calls information for the historical time period, as well as active call percentages and cumulative percentages. As can be seen in FIG. 4, twice during the sample hour of 2 p.m. to 3 p.m. a unit was dispatched as the ninth active call [412 and 434]; therefore the a "2" is entered into the "9th unit" slot of week "1" of the active calls tables [512]. Likewise, three times in the hour a unit was dispatched as the 8th active call [428, 432, and 444]; a "3" is entered in to the "8th unit" slot [514]. Two units were dispatched as the 7th active call [422, 426, and 442]; a "3" is therefore entered into the "7th unit" slot [515].

Data for each week of the historical period is likewise entered into the active calls table. A sum is then computed for each active unit for the historical period [520]; in this sample, there were four calls that were the 6 active call during the historic period; 48 that were the 7th active call; 73 that were the 8th active call; 40 that were the 9th active call; and 3 that were the 10th active call.

The total number of calls is also computed for the historical period [530, 532]. For each level of unit activity, the number of active calls is divided by the total number of calls to give a percentage [522]. Stated mathematically:

$$\%_{iP} = \frac{N_{ik}}{N_{iT}} \times 100 \quad (4)$$

Where:

$N_{ik}$=Number of times in all hours i over x weeks that busy calls jumped from k to k+1 And:

$N_{iT}$=Total number of calls in all hours i over x weeks

A cumulative percentage 524 is also computed, which is the sum of the percentage as computed above for the given level of unit activity, and all the percentages for all fewer numbers of active units:

$$CUM\%_{iP} = \frac{\sum_{K=1}^{P} N_{ik}}{N_{iT}} \times 100 \quad (5)$$

Response Availability Profile

FIG. 6 illustrates how the cumulative percentages for each time period are assembled into a response availability profile. The active calls table procedure described above is repeated for each time interval; the cumulative percentages are then assembled into a response availability profile that may be utilized for resource allocation and scheduling. The example in FIG. 6 shows a portion of a sample profile representing Monday.

The primary advantage of the response availability profile over prior art methods when used for resource allocation and scheduling is that the response availability profile provides much improved knowledge of the effects of scheduling different numbers of units in a given hour.

Extension of the Method of the Present Invention to a Third Dimension

The effects of activity in the previous hour may impact the availability of resources in the current hour. For example, there may be uncompleted calls at the end of an hour, or a backlog of calls which have not been responded to, which result in units being unavailable at the beginning of an hour. Since the staffing level in the previous hour influences resource allocation and scheduling decisions for the current hour, it is desirable to create an availability profile which reflects the influence of staffing during the previous hour.

The response availability profile as generated from the specific calls history, as described above, reflects the demand for resources with the actual previous hour's staffing level that existed when the data was accumulated. To provide additional information for resource allocation and scheduling, the method of the present invention may be extended to a "third dimension", where the third dimension represents different levels of staffing in the preceding hour (see FIG. 7).

Referring again to FIG. 2, creating a response availability "cube" is done by taking the actual call-received times from the specific calls history 214, and simulating an active calls table for various previous-hour staffing levels. Historical information 216 concerning out-of-chute times, travel times, and service times at different times of the day and day of the week are used in the simulations. When, in the simulation, a unit is not available to be sent on a call, the call is placed in a queue until a vehicle becomes available.

Figure 7:
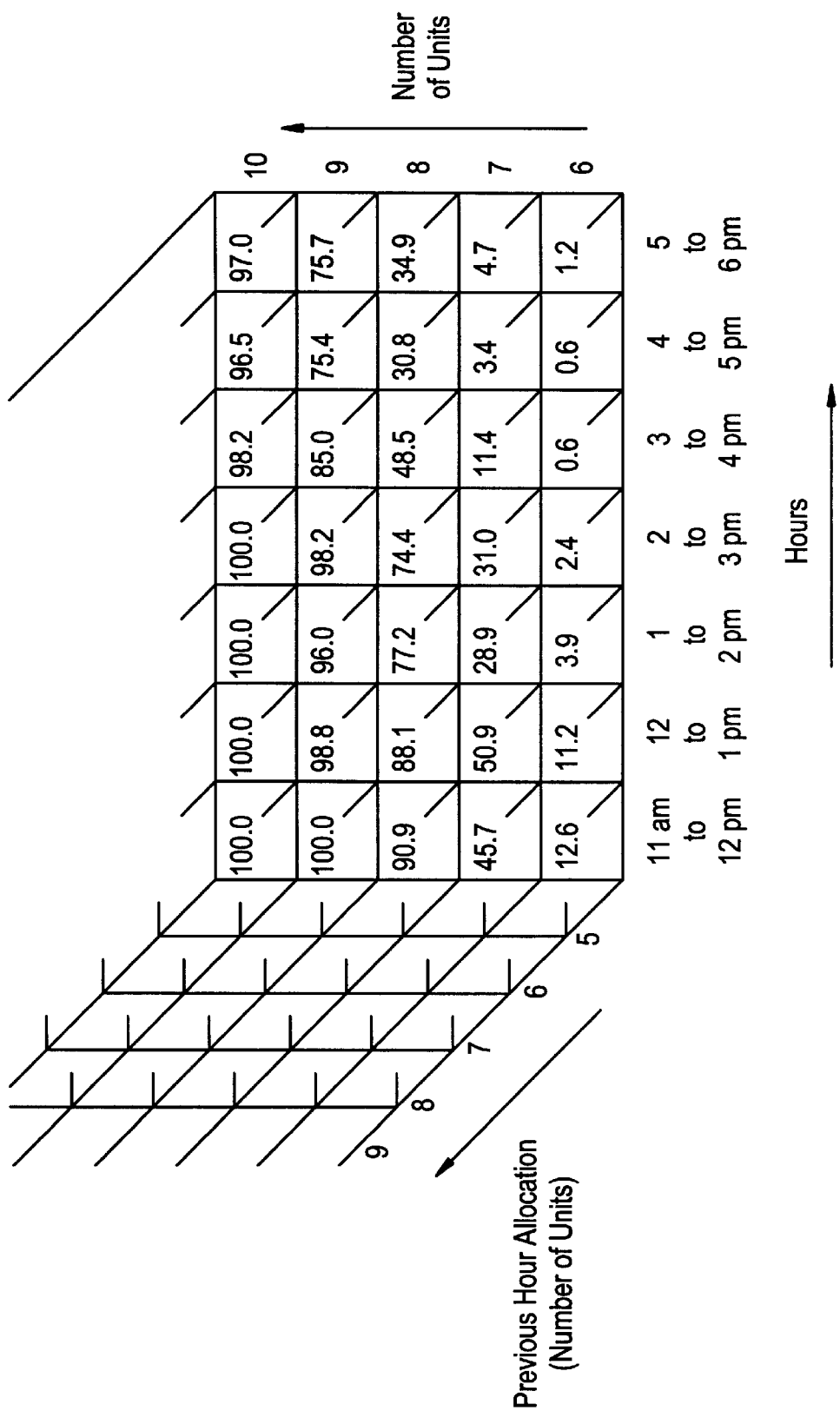
FIG. 7 is a sample response availability profile "cube".

The simulation is run for a range of possible previous-hour staffing levels. Each level results in a simulated response availability profile; the profiles are then grouped as a "cube". A portion of such a "cube" is shown in FIG. 7. Assuming that 5 units is an appropriate staffing level, a "plane" through the cube at the "5" level will resemble the response availability profile of FIG. 6.

The response availability cube can then be utilized by resource allocation and scheduling software to better address the effects of fluctuating hourly demand and staffing levels.

Other Applications

The above is a detailed description of particular embodiments of the invention. It is recognized that departures from the disclosed embodiments may be within the scope of this invention and that obvious modifications will occur to a person skilled in the art. This specification should not be construed to unduly narrow the full scope of protection to which the invention is entitled.

While the present invention is discussed with respect to the scheduling of ambulance services, the techniques are also applicable to other scheduling tasks where the service time is lengthy with respect to the measurement time period, such as scheduling nurses, police, and casino employees.

What is claimed is:

1. A method of determining historical service demand for use in forecasting the future demand for ambulance services, based on dividing the week into scheduling increments, comprising:

a) accumulating for an historically-significant period of time records of requests for service, said records including information on:
   1) the time at which the request for service was received, and
   2) the time at which service was completed;
b) determining from the accumulated records the total number of requests for service received during each scheduling increment over the historical period;
c) determining from the accumulated records the number of active calls at the time each request for service was received,
d) for each scheduling increment during the week, determining for each level of active calls the number of times during the historical period that the number of active calls increased from that level;
e) for each scheduling increment during the week, computing for each level of active calls the ratio of the number of times during the historical period that the number of active calls increased from that level to the total number of request for service received during the scheduling increment; and
f) forming a matrix representing the ratios for each level of active calls and each scheduling increment.

2. A method of resource allocation and scheduling of ambulance services based on fitting potential schedules to the matrix of claim 1.

3. The method of claim 1 wherein the scheduling increments are one hour.

4. A method of allocating ambulance services to a particular geographic region for a selected time period of the week, in order to be able to immediately dispatch an ambulance in response to at least a predetermined desired percentage of the calls that are expected to be received during that selected time period, comprising the steps of:
   a) for the corresponding time period of each one of a statistically significant number of previous weeks, recording information showing active service calls for which an ambulance has been dispatched but has not yet returned to the station, including the level of such active calls during various portions of each such time period, and also the rises and falls in the level of active calls during each such time period;
   b) analyzing the recorded information to determine the highest level of active calls at any one time, the number of instances in which the number of active calls increased to that highest level, the number of instances in which the number of active calls increased to the next highest level, the number of instances in which the number of active calls increased to the third highest level, and so on;
   c) applying the predetermined desired percentage to the foregoing thus-analyzed information to determine a target number of ambulances that will be required in order to be able to immediately dispatch an ambulance in response to at least the predetermined desired percentage of expected calls; and
   d) then allocating that target number of ambulances to the particular geographic region at the beginning of the selected time period.

5. A method of allocating ambulance services to a particular geographic region for a selected time period of the week, in order to be able to immediately dispatch an ambulance in response to at least a predetermined desired percentage of the calls that are expected to be received during that selected time period, comprising the steps of:
   a) for the corresponding time period of each one of a statistically significant number of previous weeks, recording information showing the number of service calls received,
   b) applying a statistical method to simulate the numbers of active service calls for which an ambulance had been dispatched but had not yet returned to the station, including the level of such active calls during various portions of each such time period, and also the rises and falls in the level of active calls during each such time period;
   c) analyzing the thus-simulated information to determine the highest level of active calls at any one time, the number of instances in which the number of active calls increased to that highest level, the number of instances in which the number of active calls increased to the next highest level, the number of instances in which the number of active calls increased to the third highest level, and so on;
   d) applying the predetermined desired percentage to the foregoing thus-analyzed information to determine a target number of ambulances that will be required in order to be able to immediately dispatch an ambulance in response to at least the predetermined desired percentage of expected calls; and
   e) then allocating that target number of ambulances to the particular geographic region at the beginning of the selected time period.

* * * * *